Dec. 12, 1961

F. S. GUTLEBER 3,013,150

DIVERSITY RECEIVING SYSTEM HAVING SEPARATE PHASE ANGLE INDICATORS

Filed Nov. 9, 1956

Inventor
FRANK S. GUTLEBER
By Percy P. Lantzy
Attorney

United States Patent Office 3,013,150

Patented Dec. 12, 1961

3,013,150
DIVERSITY RECEIVING SYSTEM HAVING SEPARATE PHASE ANGLE INDICATORS

Frank S. Gutleber, Totowa Borough, N.J., assignor to International Telephone and Telegraph Corporation, Nutley, N.J., a corporation of Maryland Filed Nov. 9, 1956, Ser. No. 621,477
4 Claims. (Cl. 250—20)

This invention relates to a radio communication system and more particularly to a signalling system having a plurality of channels.

In typical radio navigation systems where two channels are used, each channel consists of a superheterodyne receiver with two antennas which receive pulsed microwave signals. Each receiver consists of two antennas, two mixers, two intermediate frequency preamplifiers, a single intermediate frequency amplifier, a gyro insert unit and one measurement unit. Each antenna feeds a balanced microwave mixer; one mixer is energized directly by a local oscillator while the other mixer is energized by a phase shifted local oscillator signal, which phase shifting is done at an audio rate. The output of the two mixers in each channel are amplified and added at an intermediate frequency. After detection in the intermediate amplifier section, the signal is then passed to the gyro insert and measurement unit which derives the signal voltages.

It is an object of this invention to transmit the signals of both channels through a single channel and thereby eliminate certain complex circuitry.

It is further an object of this invention by thus simplifying the circuitry to increase system reliability, reduce components and production costs, and reduce the space and weight heretofore required by such systems.

A feature of this invention is the combining of the RF signal input of two separate channels, each channel having two RF signal inputs, by superimposing the said signals of said first channel upon a frequency modulated audio subcarrier of a specific frequency; and a like procedure for the RF signal inputs of the second channel but using a different frequency for the audio subcarrier, combining the four resulting signals, detecting the combined signal to eliminate the RF carrier frequency, filtering and then detecting the filtered signals to extract the desired signal information of the first and second channels and rejecting any spurious frequencies that may be generated.

Another feature of this invention is splitting up of the phase shift for each channel in order to make possible the rejection in the filter stage of the spurious frequencies.

The above-mentioned and other features and objects of this invention will become more apparent by reference to the following description taken in conjunction with the accompanying drawings, in which.

Figure 1:
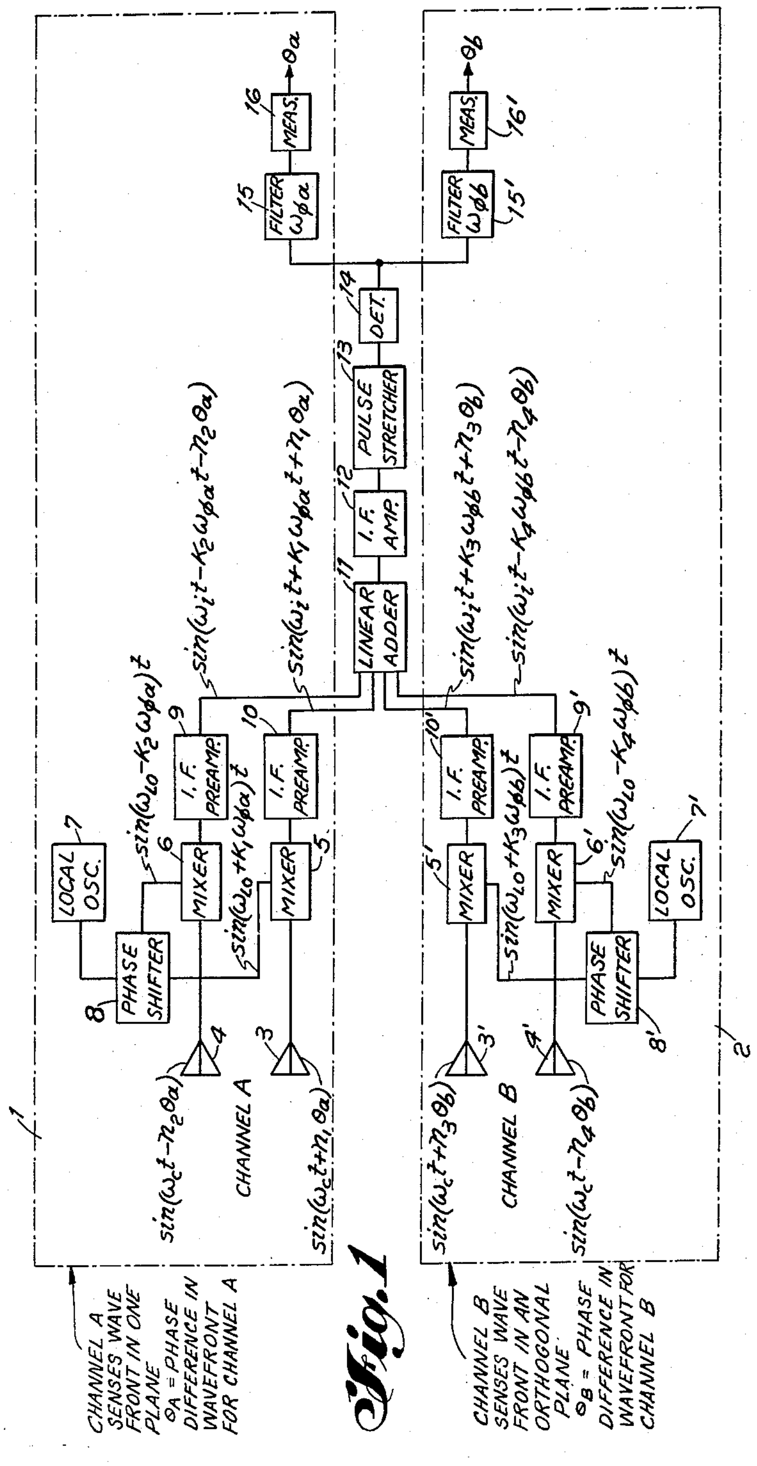
FIG. 1 is a block diagram showing an embodiment of my invention.

FIG. 1 shows two essentially identical channels, channel A 1 and channel B 2. Channel A is a superheterodyne receiver with two antennas 3 and 4 coupled respectively to mixers 5 and 6. The output of the local oscillator 7 is connected to a phase shifter 8, the two outputs of which are coupled to mixers 5 and 6. Intermediate frequency preamplifier 9 is coupled to mixer 6 and intermediate frequency preamplifier 10 is coupled to mixer 5. Channel B is a superheterodyne receiver with two antennas 3′ and 4′ coupled respectively to mixers 5′ and 6′. Antennas 3 and 4 and 3′ and 4′ represent, respectively, two pairs of orthogonally spaced antennas in two planes, each of which receives a wave front. The time of reception is different at each antenna and thus serves to give phase information, as for direction finding purposes. Local oscillator 7′ is connected to phase shifter 8′, the two outputs of which are coupled to mixers 5′ and 6′. Intermediate frequency preamplifier 9′ is coupled to mixer 6′ and intermediate frequency preamplifier 10′ is coupled to mixer 5′. The outputs of intermediate frequency preamplifiers 9 and 10 of channel A and the outputs of intermediate frequency preamplifiers 9′ and 10′ of channel B are coupled to a linear adder 11, of the type, for example described on pp. 148–150, inclusive, in the book "Electron Tube Circuits" by Samuel Seely, first edition, published by McGraw Hill Company which is common to both channels. Linear adder 11 is coupled to an intermediate frequency amplifier 12 and the signal from said intermediate frequency amplifier 12 is passed to the pulse stretcher 13, of the type, for example, described on page 401 in the book "Guidance" by Arthur S. Locke, first edition, published by Van Nostrand Company and then to the detector 14, said intermediate frequency amplifier 12, the pulse stretcher 13 and the detector 14 being common to channels A and B. The purpose of the pulse stretcher 13 in this circuit is to increase the energy of the pulse by stretching the pulse to thereby facilitate the detection of the audio sub-carriers. The pulse stretcher is required where pulse signals are being received but are not necessary in CW operation. The output of detector 14 is coupled to filter 15 of channel A and filter 15′ of channel B. The output of filter 15′ is fed to measurements unit 16 and the output of filter 15′ is coupled to measurements unit 16′.

Operation of the unit is as follows. There are two radio frequency signal inputs to channel A, $\sin(\omega_c t - \eta_2\theta_a)$ to antenna 4 and $\sin(\omega_c t + \eta_1\theta_a)$ to antenna 3; the radio frequency signal inputs to channel B are $\sin(\omega_c t - \eta_4\theta_b)$ to antenna 4′ and $\sin(\omega_c t + \eta_3\theta_b)$ to antenna 3′. It is obvious that the frequencies of all four signals are the same; the signal information of channel A is $\theta_a$ which represents the phase difference between the two signal inputs of channel A. The signal information of channel B is $\theta_b$ which represents the phase difference between the two signal inputs of channel B; $n_1+n_2=1$ and $n_3+n_4=1$. The local oscillator 7 for channel A generates a signal $\sin(\omega_{LO})$ which is phase shifted by the phase shifter 8 by the quantity $\phi_a$ and is then split up into two parts which results in two frequency modulated audio subcarrier outputs of the phase shifter 8 $\sin(\omega_{LO} - k_2\omega_{\phi a})t$ and $\sin(\omega_{LO} + k_1\omega_{\phi a})$. Phase shifter 8 may be considered as composed of two phase shifters each having a separate output, though it can be one phase shifter with two outputs, one output being $k_1\omega_{\phi a}$ and the other output being $k_2\omega_{\phi a}$, where $k_1+k_2$ is unity. These frequencies are sub-carriers which are superimposed in a form of frequency modulation on the local oscillator signal. The frequency modulated audio sub-carrier $\sin(\omega_{LO} - k_2\omega_{\phi a})t$ is passed to the mixer 6 and upon it is superimposed the input signal from antenna 4 $\sin(\omega_c t - \eta_2\theta_a)$ resulting in a signal converted to the intermediate frequency $\sin(\omega_1 t - k_2\omega_{\phi a}t - \eta_2\theta_a)$. The second phase shifter 8 frequency modulated audio sub-carrier $\sin(\omega_{LO} + k_1\omega_{\phi a})t$ is fed to the mixer 5 and upon it is superimposed the input signal from antenna 3 $\sin(\omega_c t + \eta_1\theta_a)$ resulting in a signal converted to the intermediate frequency $$\sin(\omega_1 t + k_1\omega_{\phi a}t + \eta_1\theta_a)$$

An identical procedure is followed for the channel B signal input. The local oscillator 7′ generates a signal $\sin(\omega_{LOb})$ which is phase shifted by the phase shifter 8′ by the quantity $\phi_b$ and is then split up into two parts which results in the two frequency modulated audio subcarrier outputs of the phase shifter 8′, $\sin(\omega_{LO} - k_4\omega_{\phi b})t$ and $\sin(\omega_{LO} + k_3\omega_{\phi b})t$. The frequency modulated audio sub-carrier $\sin(\omega_{LO}-k_4\omega_{\phi b})t$ is passed to the mixer 6' and upon it is superimposed the input signal from antenna 4' $\sin(\omega_c t-\eta_4\theta_b)$ resulting in a signal converted to the intermediate frequency $\sin(\omega_i t-k_4\omega_{\phi b}t-\eta_4\theta_b)$. The second phase shifter 8' frequency modulated audio sub-carrier $\sin(\omega_{LO}+k_3\omega_{\phi b})t$ is fed to the mixer 5' and upon it is superimposed the radio frequency signal input from an antenna 3' resulting in a signal converted to the intermediate frequency $\sin(\omega_i t+k_3\omega_{\phi b}t+\eta_3\theta_b)$. The constants $k_1$ and $k_2$ determine the appropriate amount of phase shift for the signal inputs of channel A, and constants $k_3$ and $k_4$ determine the appropriate amount of phase shifts for the signal inputs of channel B, which are required to reject the spurious signals in the filter stages of both channels as will be shown later.

Consider the four inputs after being converted to the intermediate frequency $$a\sin(\omega_i t+k_1\omega_{\phi a}t+n_1\theta_a)=a\sin x$$
$$a\sin(\omega_i t-k_2\omega_{\phi a}t-n_2\theta_a)=a\sin y$$
$$a\sin(\omega_i t+k_3\omega_{\phi b}t+\eta_3\theta_b)=a\sin u$$
$$a\sin(\omega_i t-k_4\omega_{\phi b}t-n_4\theta_b)=a\sin v$$

where $$k_1+k_2=1$$
$$k_3+k_4=1$$

and $\omega_{\phi a}$ is the channel A phase shifter frequency
$\omega_{\phi b}$ is the channel B phase shifter frequency
$\theta_a$ is the signal information for channel A
$\theta_b$ is the signal information for channel B $$n_1+n_2=1 \qquad n_3+n_4=1$$

After adding the above signals in the linear adder 11, any non-linearity in the system such as in square law detection would result in a signal of the form:

$$e=a^2(\sin x+\sin y+\sin u+\sin v)^2$$

Neglecting the square terms which would result in frequencies of the order of twice the IF carrier frequency, the expansion of the above equation would result in:

$$e=a^2(2\sin x\sin y+2\sin x\sin y\sin v$$
$$+2\sin x\sin v+2\sin u\sin v+2\sin y\sin u)$$
$$e=a^2[\cos(x-y)-\cos(x+y)+\cos(x-u)-\cos(x+u)$$
$$+\cos(y-v)-\cos(y+v)+\cos(x-v)-\cos(x+v)$$
$$+\cos(u-v)-\cos(u+v)+\cos(y-u)-\cos(y+u)]$$

Neglecting the terms in the above equation that consist of the sum of the angles since these frequencies would be of the order of twice the intermediate frequency, the output frequencies would consist of:

(1) $(x-y)=(k_1+k_2)\omega_{\phi a}t+\theta_a=\omega_\phi t+\theta_a$
(2) $(x-u)=k_1\omega_{\phi a}t-k_3\omega_{\phi b}t+n_1\theta_a-n_3\theta_b$
(3) $(y-v)=k_4\omega_{\phi b}t-k_2\omega_{\phi a}t+n_4\theta_b-n_2\theta_a$
(4) $(x-v)=k_1\omega_{\phi a}t+k_4\omega_{\phi b}t+n_1\theta_a+n_4\theta_b$
(5) $(u-v)=(k_3+k_4)\omega_{\phi b}t+\theta_b=\omega_{\phi b}t+\theta_b$
(6) $(y-u)=k_2\omega_{\phi a}t+k_3\omega_{\phi b}t+n_2\theta_a+n_3\theta_b$ The first and fifth terms are the wanted information. The second, third, fourth and sixth terms are spurious frequencies; however, if the phase is split with appropriate values given to the $k$ factors these frequencies could be made to be far enough from $\omega_{\phi a}$ and $\omega_{\phi b}$ so as not to introduce crosstalk.

The six output signals of the detector 14 are fed to the filter 15 of channel A and filter 15' of channel B. Filter 15 has a center frequency $\omega_{\phi a}$ and a bandpass sufficiently narrow to reject the spurious signals and pass only the desired signal of channel A, $\omega_{\phi a}t+\theta_a$. Similarly filter 15' has a center frequency $\omega_{\phi b}$ sufficiently narrow to reject the spurious signals and pass only the desired signal of channel B $\omega_{\phi b}t+\theta_b$.

Figure 2:
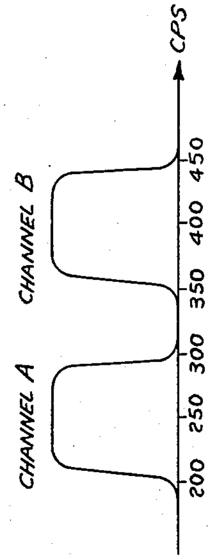
FIG. 2 shows the bandpass characteristic of the first and second channel filters.

FIG. 2 shows the typical operating conditions of filters 15 and 15'. Using the values of:

$k_1=1 \quad k_3=½ \quad \omega_{\phi a}=250$ c.p.s.
$k_2=0 \quad k_4=½ \quad \omega_{\phi b}=400$ c.p.s.

It is apparent that the output signal of the detector 14 $\omega_{\phi a}t+\theta_a$ will pass through channel A filter 15 and the detector 14 output signal $\omega_{\phi b}t+\theta_b$ would pass through the channel B filter 15'. $\theta_a$ is the desired channel A signal information superimposed on the audio sub-carrier $\omega_{\phi a}t$; $\theta_b$ is the desired channel B signal information superimposed upon the audio sub-carrier $\omega_{\phi b}t$. These two signals are the ones that will pass through the filters 15 and 15'. The other signals are the spurious signals which will be rejected. If we substitute the values of $k$ given above and assume $n_1\theta_a$, $n_2\theta_a$, $n_3\theta_b$, $n_4\theta_b$ to be so small they can be neglected, we get the following:

$$k_1\omega_{\phi a}t-k_3\omega_{\phi b}t+n_1\theta_a-n_3\theta_b=50$$
$$k_4\omega_{\phi b}t-k_2\omega_{\phi a}t+n_3\theta_b-n_2\theta_a=200$$
$$k_1\omega_{\phi a}t+k_4\omega_{\phi b}t+n_1\theta_a+n_4\theta_b=450$$
$$k_2\omega_{\phi a}t+k_3\omega_{\phi b}t+n_2\theta_a+n_3\theta_b=200$$

The 200 c.p.s. signal is on the low limit of the pass band of the channel A filter and will be rejected, the 450 c.p.s. signal is on the upper limit of the channel B filter pass band and will be rejected; the 50 c.p.s. signal is outside the pass band of channel A and B filters and will be rejected. The signal output of filter 15 $\omega_{\phi a}t+\theta_a$ is fed to the measurement unit 16 where it is detected and the desired channel A signal information $\theta_a$ is extracted. Similarly the signal output of filter 15' $\omega_{\phi b}t+\theta_b$ is fed to the measurements unit 16' where it is detected and the desired channel B signal information $\theta_b$ is extracted.

While I have described above the principles of my invention in connection with specific apparatus, it is to be clearly understood that this description is made only by way of example and not as a limitation to the scope of my invention as set forth in the objects thereof and the accompanying claims.

I claim:

1. In combination, a signalling system consisting of first and second channels having the same radio frequency carrier but having phase different signal information $\theta_a$ and $\theta_b$, respectively, comprising for each channel first and second radio antennas adapted to receive the carrier frequency waves displaced in phase when the wave front thereof is non-parallel to the alignment of said first and second antennas, first and second mixers coupled to said first and second radio antennas, a local oscillator, a phase shifter to phase shift the output of said oscillator by a sub-carrier frequency coupling said local oscillator to said first and second mixers, to shift the phase of the output of said local oscillator at an audio sub-carrier frequency and first and second intermediate frequency preamplifiers, said sub-carriers of said first and second channels having different frequencies; a linear adder coupled to said first and second preamplifiers of said first and second channels, a signal stretcher, an intermediate frequency amplifier coupling said stretcher to the output of said linear adder, a detector, a first measurement unit, a first filter tuned to the frequency of said audio sub-carrier of said first channel coupling said first measurement unit to the output of said detector, a second measurement unit, a second filter tuned to the frequency of said audio sub-carrier of said second channel coupling said second measurement unit to the output of said detector, the output of said first measurement unit being the signal phase information $\theta_a$ of said first channel, the output of said second measurement unit being the signal phase information $\theta_b$ of said second channel.

2. In combination, a signalling system consisting of first and second channels comprising for each channel first and second means for receiving radio frequency signals of the same frequency but which may differ in phase and capable of passing spurious signals, means to produce two local oscillator signals having a common frequency but shifted in phase at an audio sub-carrier frequency, and means utilizing said local oscillator signals to convert each of said radio frequency signals to an intermediate frequency, said audio sub-carrier of said first channel differing in frequency from said audio sub-carrier of said second channel; means to sum said converted signals of said first and second channels, means to stretch said summed signals, detector means to detect the audio sub-carrier frequencies of said first and second channels which contain said signal phase information and said spurious signals, first filter means to pass the audio sub-carrier frequency and the signal phase information of said first channel and reject said spurious signals, first measurement means to detect said phase signal information of said first channel, second filter means to pass the audio sub-carrier frequency and signal phase information of said second channel and reject said spurious information and second measurement means to detect said signal information of said second channel.

3. In a signalling system consisting of first and second channels comprising two radio frequency phase different signal inputs for each channel, means to produce two first channel local oscillator signals having a common frequency but shifted in phase at a first audio sub-carrier frequency wherein one of said first channel local oscillator signals has the form $k_1\omega_{\phi a}$ and the other has the form $k_2\omega_{\phi a}$, where $\omega_{\phi a}$ is said first audio sub-carrier frequency and $k_1+k_2$ equal unity, means to produce two second channel local oscillator signals having a common frequency but shifted in phase at a second audio sub-carrier frequency wherein one of said second channel local oscillator signals has the form $k_3\omega_{\phi b}$ and the other has the form $k_4\omega_{\phi b}$, where $\omega_{\phi b}$ is said second audio sub-carrier frequency and $k_3+k_4$ equal unity, said second channel local oscillator signals having the same local oscillator frequency of said first channel, means utilizing said first channel local oscillator signals to convert the radio frequency signal inputs of said first channel to intermediate frequency signals, means utilizing said second channel local oscillator signals to convert the radio frequency signal inputs of said second channel to intermediate frequency signals, means to add and amplify said intermediate frequency signals of said first and second channels into one signal whose voltage is proportional to the square of the sum of said signals of said first and second channels, means to detect and filter said added signal into a first channel signal comprising the sum of the audio sub-carrier frequency of said first channel and signal information of said first channel, and a second channel signal comprising the sum of the audio sub-carrier frequency of said second channel and signal information of said second channel, means to derive from said first channel signal the phase information thereof, and means to derive from said second channel signal the phase information thereof.

4. In a signalling system comprising first and second channels, said first channel having first and second radio frequency signals of the same frequency, said first radio frequency signal differing in phase from said second radio frequency signal, means to produce two local oscillator signals having a common frequency but shifted in phase at a first audio sub-carrier frequency wherein one of said first channel local oscillator signals has the form $k_1\omega_{\phi a}$ and the other has the form $k_2\omega_{\phi a}$, where $\omega_{\phi a}$ is said first audio sub-carrier frequency and $k_1+k_2$ equal unity, means utilizing said local oscillator signals to convert the radio frequency signal inputs of said first channel to intermediate frequency signals, said second channel having third and fourth radio frequency signals of the same frequency, said radio frequency being the same as the radio frequency of said first and second radio frequency signals of said first channel, said third radio frequency signal being different in phase from said fourth radio frequency signal, means to produce two other local oscillator signals having a common frequency but shifted in phase at a second audio sub-carrier frequency wherein one of said second channel local oscillator signals has the form $k_3\omega_{\phi b}$ and the other has the form $k_4\omega_{\phi b}$ where $\omega_{\phi b}$ is said second audio sub-carrier frequency and $k_3+k_4$ equal unity, said other local oscillator signals having the same local oscillator frequency of said first channel, means utilizing said other local oscillator signals to convert said radio frequency signals of said second channel to intermediate frequencies, means to sum said converted signals of said first channel and said converted signals of said second channel, means to amplify and stretch said summed signal, means to detect said summed, amplified and stretched signal and detect the audio sub-carrier frequencies of said first and second channels which contain said signal information and spurious signals of said first and second channels, first filter means to pass the audio sub-carrier frequency and the signal information of said first channel and to reject said spurious signals of said first and second channels, first measurement means to derive the phase signal information of said first channel, second filter means to pass the audio sub-carrier frequency and the signal information of said second channel and to reject said spurious signals of said first and second channels, and second measurement means to derive the phase signal information of said second channel.

References Cited in the file of this patent

UNITED STATES PATENTS

| | | |
|---|---|---|
| 1,830,242 | Ranger | Nov. 3, 1931 |
| 2,481,516 | Jacobsen | Sept. 13, 1949 |

FOREIGN PATENTS

| | | |
|---|---|---|
| 569,303 | Great Britain | May 17, 1945 |